July 22, 1969        G. R. GRADO        3,457,394

ELECTRONIC RESOLVER

Filed March 25, 1966        3 Sheets-Sheet 1

INVENTOR.
GILBERT R. GRADO
By White & Haefliger
ATTORNEYS.

July 22, 1969   G. R. GRADO   3,457,394
ELECTRONIC RESOLVER
Filed March 25, 1966   3 Sheets-Sheet 2
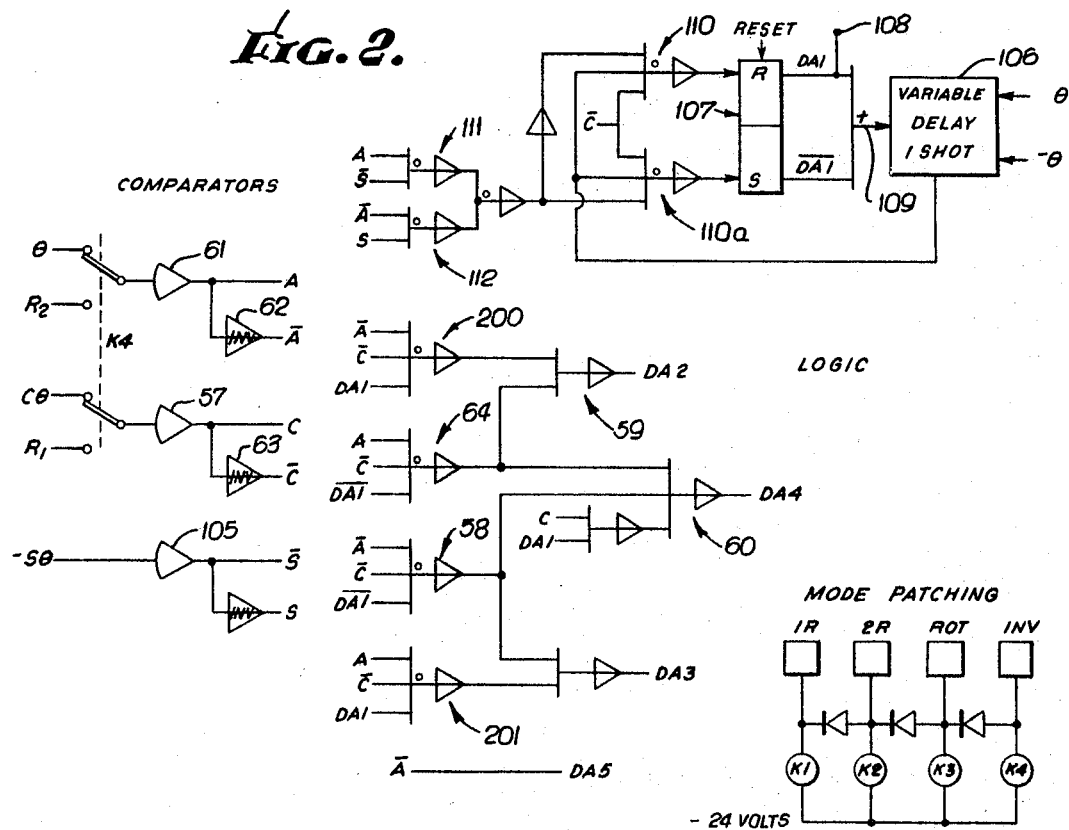
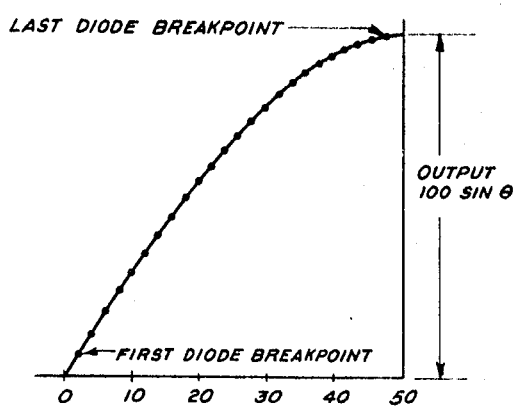
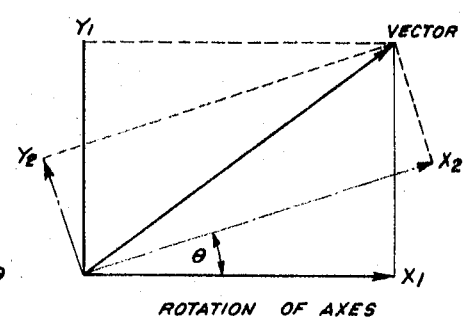
INVENTOR
GILBERT R. GRADO
BY White & Haefliger
ATTORNEYS.

July 22, 1969 G. R. GRADO 3,457,394
ELECTRONIC RESOLVER
Filed March 25, 1966 3 Sheets-Sheet 3

INVENTOR.
GILBERT R. GRADO
By White & Haefliger
ATTORNEYS.

United States Patent Office 3,457,394
Patented July 22, 1969

3,457,394
ELECTRONIC RESOLVER
Gilbert R. Grado, Tustin, Calif., assignor to Astrodata, Inc., Anaheim, Calif., a corporation of California
Filed Mar. 25, 1966, Ser. No. 537,525
Int. Cl. G06g 7/22
U.S. Cl. 235—189
18 Claims

ABSTRACT OF THE DISCLOSURE

The disclosure concerns an electronic resolver capable of polar to rectangular conversion, rectangular to polar conversion and rotation of axes conversion; and also capable of additional modes of operation including rate mode.

---

The present invention relates generally to computing equipment, and more specifically concerns electronic resolvers for use in such equipment.

Resolvers are useful in computing systems to provide one or more outputs that depend upon one or more inputs. For example, the simulation of three dimensional, six degree of freedom systems usually requires the use of accurate coordinate transformation so that rectangular-to-polar and polar-to-rectangular conversions may be effected with a high degree of precision and reliability.

It is a major object of the invention to provide an unusually effective and reliable resolver characterized by combinations and sub-combinations of the following features and advantages: the resolver accepts input representative of an angle $\theta$ and of a scalar quantity $R_1$ and produces sin $\theta$ and cosine $\theta$ sinusoid generation output, and $R_1$ sin $\theta$, $R_1$ cos $\theta$ output for polar to rectangular conversion; the resolver also accepts $R_2$ input to produce $R_2$ sin $\theta$ and $R_2$ cos $\theta$ output for polar to rectangular conversion; the resolver accepts $X_1$ and $Y_1$ input as well as $\theta$ input to produce $Y_1$ cos $\theta$ $-X_1$ sin $\theta$ output and $X_1$ cos $\theta + Y_1$ sin $\theta$ output for rotation of axes mode; the resolver accepts X and Y inputs and provides outputs $\sqrt{X^2+Y^2}$ and tan$^{-1} Y/X$ for rectangular to polar transformation; and the resolver accepts rate input such as $d\theta/dt$ and generates continuous sine and cosine functions for rate mode operation. As to the latter, switching circuitry permits the sine function to appear as a continuous wave even though the input angle $\theta$ passes through a reverse cycle. Also the rate logic accepts an extremely wide range of rate inputs. Finally, the equipment for sine and cosine function generation is simplified by the provision for inversion of $\theta$ input to provide both $\theta$ and $-\theta$ input to the function generators.

Basically, the resolver comprises sine and cosine generators having summing paths for fixed amplitude signals associated with a 2$\pi$ radian or 360 degree range and for an input signal $\theta$ variable within limits associated with the boundaries of that range; switch means connected in circuit with such paths to control signal application to the generators via said paths; and control logic to operate the switches in such relation to change of $\theta$ between such limits that the generators will generate sine and cosine values of $\theta$. Typically, the sine generator has associated summing paths for input signals defined as $\theta$, $-2\theta$, $\pi$ and $-\pi$; the cosine generator has associated summing paths for input signals defined as $\theta$, $-2\theta$ and $\pi/2$; the switch means is connected in circuit with certain of such paths to control application of the signals $-2\theta$, $\pi$ and $-\pi$ to the generators; and the control logic operates the switches in such relation to values of $\theta$ between upper and lower limits associated with $\pi$ and $-\pi$ that the generators generate sine and cosine versions of $\theta$.

As will appear, the resolver may include multiplier means connectible to receive input via the generators, and paths connected to supply scalar input to the multipliers so that the latter produce output products of the generator and scalar inputs. For example, such output products may include values $-R_1$ sin $\theta$ and $-R_1$ cos $\theta$, and also $R_2$ cos $\theta$ and $-R_2$ sin $\theta$. As regards rotation mode, the multiplier means may include primary multipliers to receive $X_1$ scalar input and secondary multipliers to receive $Y_1$ scalar input, the multiplier outputs connected to yield outputs $Y_1$ cos $\theta$ $-X_1$ sin $\theta$ and $-X_1$ cos $\theta$ $-Y_1$ sin $\theta$. For rate mode, the resolver may typically include means to supply an integrated version of an input $d\theta/dt$ to the $\theta$ paths to the generators. Such means may typically include an integrator having output connected in series with such $\theta$ paths, inputs for positive and negative versions of $d\theta/dt$, and means to vary the application of at least one of the inputs to the integrator at times when $\theta$ passes through its limits, thereby to produce a continuous wave. Finally, the invention contemplates the provision for conversion of rectangular to polar coordinates in an unusual and advantageous manner which will hereafter appear.

These and other objects ad advantges of the invention, as well as the details of an illustrative embodiment, will be more fully understood from the following detailed description of the drawings, in which:

FIG. 2 is a block diagram of control logic for the FIG. 1 resolver;

FIG. 5 illustrates development of a sine curve by the FIG. 4 generator; and

FIG. 6 illustrates graphically a transformation of axes.

Figure 1:
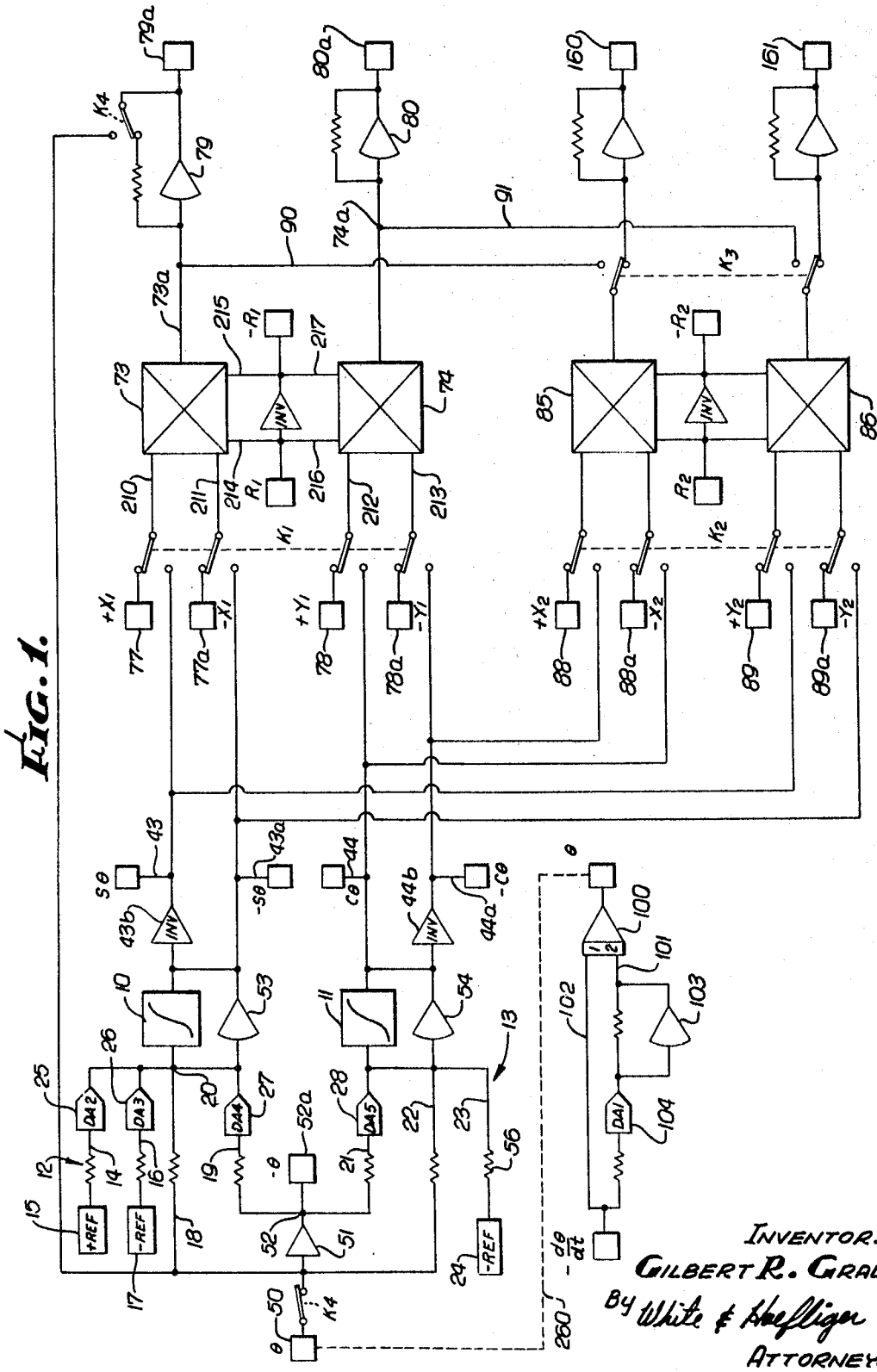
FIG. 1 is a block diagram of one preferred form of the resolver.

As mentioned, the resolver incorporates sine and cosine generators and summing paths for fixed amplitude input signals associated with a preselected radian range, and for an input signal (arbitrarily designated as $\theta$) which is variable within limits associated with the boundaries of the selected radian range. As one example of this, FIG. 1 illustrates sine and cosine generators 10 and 11, and groups 12 and 13 of summing paths for sine and cosine generator input signals. Group 12 typically includes path 14 for a positive reference input signal from source 15 and of fixed amplitude associated with a $+\pi$ radian upper limit; path 16 for a negative reference input signal from source 17 and of fixed amplitude associated with a $-\pi$ radian lower limit; path 18 for an input signal representative of an input angle $\theta$ variable between limits delineating an associated 2$\pi$ radian range; and path 19 for an input signal representative of the input value $-2\theta$. As to the latter, the $\theta$ input at 50 is typically passed to an inverter 51 to produce $-\theta$ at 52 and at take off point 52*a*. Such paths have summing connection at input point 20 to the sine generator 10.

In like manner, the group 13 includes path 21 for an input signal representative of the input value $-2\theta$; path 22 for an input signal representative of the input value $\theta$; and path 23 for a positive reference input signal from source 24, and of fixed amplitude associated with a $\pi/2$ radian value. These paths also have summing connection at input point 30 to cosine generator 11. Appropriate resistors may be used in the paths, as illustrated, for proper relative signal level development.

Also, as was previously mentioned the resolver includes switch means connected in circuit with certain of the summing paths to control signal application to the generators via the paths. In the illustrated example, switches 25, 26 and 27 are connected in series circuit with respective paths 14, 16 and 19 to control application of the signals $\pi$, $-\pi$ and $-2\theta$ to the sine generator, and switch 28 is connected in path 21 to control application of the signal $-2\theta$ to the cosine generator.

Control logic is provided in accordance with the invention to operate the switches in such relation to change of $\theta$ between the limits associated with the boundaries of the preselected radian range that the generators will generate sine and cosine versions of $\theta$. In the particular example, the control logic places the switches in on and off states in accordance with the associated waveforms 25a, 26a, 27a and 28a seen in FIG. 3. Accordingly, as the $\theta$ input to paths 18 and 22 varies over the $2\pi$ range between $-\pi$ and $+\pi$ as seen in ramp or sawtooth waveform 40 in FIG. 3, the generators 10 and 11 produce sin $\theta$ and cos $\theta$ outputs designated by waveforms 41 and 42, and appearing at output points 43 and 44 in FIG. 1. Note also $-\sin \theta$ output point 43a, at the output of amplifier 53 and sin $\theta$ output at the output of inverter 43b. Similarly, see cos $\theta$ at 44, at output of amplifier 54, and $-\cos \theta$ at 44a at output of inverter 44b. In this regard, such $\theta$ input may have amplitude represented in terms of volts, so that at $\theta=0$ volts in FIG. 3, the sine and cosine output voltages are 0 and 100 respectively.

In a typical example, digital-to-analog switches 25 and 26, indicated as DA2 and DA3, have ±100 volts reference (equivalent to ±180 degrees relative to $\theta$ input) applied to their respective inputs. Their outputs are also connected to the input of the sine generator. The $-\theta$ output from the inverter 51 is applied to switches 27 and 28, indicated as DA4 and DA5. A $-100$-volt input at 23 to the cosine generator applies the correct reference value for cosine generation [sin $(90°+\theta)=\cos \theta$].

The high-gain amplifiers at 53 and 54 in FIG. 1 respectively have the sine and cosine generators 10 and 11 connected as feedbacks, making each a variable gain amplifier. Assuming a $\theta$ input of zero volts (each sine and cosine generator is typically scaled to an output of 1.8 degrees per volt input), the output of the sine generator is zero volts, and the cosine generator output is $+100$ volts. These values correspond to the correct sine and cosine values of sin $\theta$ at $\theta=0$ and cos $\theta=\sin (90°+\theta)$.

Figure 3:
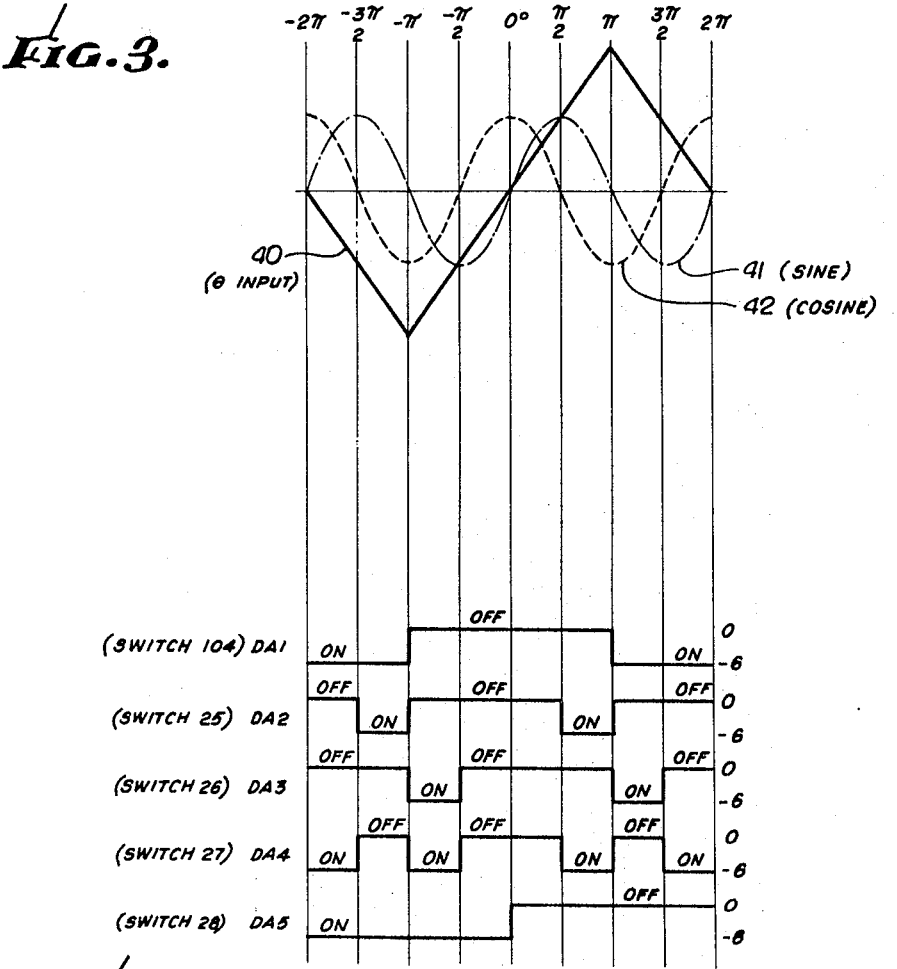
FIG. 3 illustrates sine and cosine output waveforms as related to input angle and also to resolver switch states.

The upper part of FIG. 3 shows a $\theta$ input at zero degrees of zero volts, and a sine and cosine output voltage of 0 and 100, respectively. The lower part of the figure shows the condition of the switches; zero volts is the off or no output condition, and $-6$ volts is the on condition. All the switches are off in the first forward quadrant (0 to $+90$ degrees). Maximum excursions of $\theta$, sine, and cosine are all ±100 volts. Note that as the second forward quadrant is entered, switches DA2 and DA4 are turned on as a comparator in the resolver logic of FIG. 2 senses the cosine value 42 crossing the zero axis. DA2 and DA4 stay turned on whenever the $\theta$ input is between $+90$ and $+180$ degrees ($+50$ and $+100$ volts). Returning again to an assumed $\theta$ input of zero (all switches off), if $\theta$ goes negative, DA5 is turned on; as $\theta$ is increased negatively past $-90$ degrees, DA3 and DA4 are turned on, and DA5 remains on.

The outputs to the sine generator 10 are $\theta$, $-2\theta$ at DA4 and $+$ and $-180$ degrees at DA2 and DA3, respectively. The inputs to the cosine generator 11 are $-2\theta$ at DA5, $\theta$, and $-90°$ through a suitable resistor 56. The $\theta$ input is typically scaled to 1.8 degrees per volt, so that the $-2\theta$ input would be $-3.6$ degrees per volt, establishing a ratio between these two inputs of 2:1. Assuming $\theta \geq 0$ degrees, and rising to not more than $+90$ degrees (all switches off), and the input variables to the sine and cosine generators are $+\theta$. As the input passes $+90°$, the comparator 57 with C and $\overline{C}$ outputs senses the output cosine value going from positive to negative (FIG. 3), i.e. C goes false (0 volts) and $\overline{C}$ goes true. The output of the NAND-Gate 64 with inputs A, $\overline{C}$ and $\overline{DA1}$ then goes false, causing the outputs of the two NAND-Gates 59 and 60 that control switches DA2 and DA4, respectively, to go true, thereby turning the switches on. Switch DA4 applies $-180$ degrees ($-2\theta$) to the sine generator input. At the same time, switch DA2 applies $+180$ degrees to the sine generator input; these values cancel each other, and the sine generator input is still the $\theta$ input, or $+90$ degrees. However, as $\theta$ continues to increase, an algebraic summation $(\theta-2\theta=-\theta)$ is being performed, the resultant of which drives the sine generator input junction 20 toward 0 volt ($+180$ degrees). In a like manner, it can be seen how switch DA5 affects the cosine generator input when a negative $\theta$ is applied, and how DA3 and DA4 affect the sine generator when a $\theta$ input of $-90$ degrees ($-50$ volts) is reached.

The logic which controls these switches may be considered to include comparator 61 to sense the polarity of the $\theta$ input ($+\theta=A$ true) and the comparator 57 to sense the polarity of the cosine generator output ($+\cos \theta=C$ true). Inverters 62 and 63 are provided to generate $\overline{A}$ and $\overline{C}$ when A and C are false. For initial conditions, assume $\theta \geq 0$. With $\theta$ going positive and the cosine output positive, A and C out of the comparator are true. When $\theta \geq +50$ volts, the output of the cosine generator crosses through zero, going negative. The C comparator senses the axis crossing; C goes false (0 volt) and $\overline{C}$ goes true ($-6$ volts).

A series of NAND-Gates is shown at 58, 64, 111, 112, 200 and 201. The assumed initial conditions of $\theta \geq 0$ volts (0 degrees) but not more than $+50$ volts ($+90$ degrees) makes A, C, and $\overline{DA1}$ true, which does not satisfy any of the NAND-Gate input requirements, and the outputs of DA2, DA3, DA4 (which are gated) and DA5 (not gated) are all at 0 volts; i.e. all the DA switches are turned off. As the voltage at $\theta$ exceeds $+50$, C goes false, and the NAND-Gate 64 with terms A, $\overline{C}$, and $\overline{DA1}$ at its input goes false, causing the output of the gates 59 and 60 controlling DA2 and DA4 to go true, thereby turning those switches on. Similarly, if the $\theta$ input goes negative from zero, $\overline{A}$ goes true, and DA5 is turned on. As $\theta$ exceeds $-50$ volts ($-90$ degrees) true $\overline{A}$, $\overline{C}$, and $\overline{DA1}$ at gate 58 cause DA3 and DA4 to turn on. This completes the description of the FIG. 2 sine and cosine mode switching logic, through ±180 degrees.

The invention also contemplates the provision of multiplier means 73 and 74 connectible, as by relays K–1, to receive input from the sine and cosine generators via paths 210–213, as well as paths 214–217 connected to supply selected scalar inputs, indicated as R and $-R$, to the multipliers, whereby the latter are operable to produce output products of the inputs. In this regard, if relays K–1 are disabled, input paths 210–213 are available for independent use, as via the input points 77, 77a, 78 and 78a. The multiplier outputs are available at 79 and 80. Thus, in the event of energization of relays K–1, the primary multipliers 73 and 74 receiving $R_1$ and $-R_1$ input on paths 214–217, and sine $\theta$ and cos $\theta$ input on paths 210–213 produce as outputs the values $-R_1 \sin \theta$ and $-R_2 \cos \theta$, usable for example in polar to rectangular conversion.

The invention also contemplates that the multiplier means may include secondary amplifiers 85 and 86 connected to receive selected scalar inputs, as for example are indicated at $R_2$, and to produce as outputs the values $R_2 \cos \theta$ and $-R_2 \sin \theta$, usable for example in dual polar to rectangular conversion, i.e. for converting two polar vectors to rectangular coordinates. This mode is enabled when relays K–2 are energized, for connecting the secondary multipliers with the ± sin $\theta$ and ± cos $\theta$ inputs. In the event of de-energization of relays K–2, input points 88, 88a, 89 and 89a are available for input to the multipliers 85 and 86. The secondary multiplier outputs appear at 160 and 161.

The resolver is also able to perform a rotation or transformation of axes computation, defined by the following two equations and exemplified in FIG. 6:

$$Y_2 = Y_1 \cos \theta - X_1 \sin \theta \quad (1)$$
$$X_2 = X_1 \cos \theta + Y_1 \sin \theta \quad (2)$$

where, the terms $X_1$ and $Y_1$ define the coordinates of a point in the first rectangular coordinate system, and the terms $X_2$ and $Y_2$ define the coordinates of the same point in a second rectangular coordinate system which is rotated through an angle $\theta$ about the origin of the first coordinate system. Thus, the values $Y_2$ and $X_2$ represent outputs of the resolver in the rotation of axes mode. As one example of this, the relays K-1, K-2 and K-3 in FIG. 1 are energized, to channel the outputs of multipliers 85 and 86 along paths 90 and 91 to summing junction output points 73a and 74a of the multipliers 73 and 74 respectively. For this purpose the scalar inputs to multipliers 73 and 74 would be $R_1 = +X_1$, and the scalar input to multiplier 85 and 86 would be $R_2 = +Y_1$. The output $-X_2$ would be represented at output 79a of amplifier 79 and the output $+Y_2$ would be represented at output 80a of amplifier 80.

The resolver enables the above described modes to be extended to include continuous resolution, termed rate mode. For this purpose means may be provided in combination with the FIG. 1 network to supply an integrated version of an input $d\theta/dt$ to the $\theta$ paths 18 and 22 to the sine and cosine generators. Such means may typically include an integrator 100 having its output connected in series with the paths 18 and 22, the integrator also having inputs at 101 and 102 for positive and negative versions of $d\theta/dt$. Such means may also include apparatus to vary the application of at least one of the inputs 101 and 102 to the integrator at times when $\theta$ passes through the $+\pi$ and $-\pi$ limits, the range between such limits for example describing one complete rotation of a rotating body. Such apparatus typically includes an operational amplifier 103, and a switch DA-1, indicated at 104 to switch $-d\theta/dt$ to the input side of that amplifier.

Basically, the operation of the resolver in rate mode causes the generator sines and cosines to continue through as many 360 degree cycles (as for example of body rotation) as desired. The timing diagram in FIG. 3 shows the DA-1 switch turned on when inputs of $\pm 180$ degrees, or $\pm \pi$ are reached. Solid line 40 indicative of $\theta$ input shows a sharp change in voltage direction is required at $-\pi$ ($-100$ volts) and $+\pi$ ($+100$ volts). In FIG. 1, the switched amplifier 103 is connected to the gain of 2 at input 101 of the integrator 100. When $\theta$ arrives as $+100$ volts ($+\pi$) switches DA2 and DA4 will be turned off, and DA1 and DA3 will be turned on. Broken line bead 260 indicates optional connection of the integrator output to the $\theta$ input point 50.

As $+180$ degrees is passed by $\theta$, the sine output from generator 10 goes negative. The $-S\theta$ (or $-\sin \theta$) value connected to the input of the comparator 105 in FIG. 2 with the S and $\bar{S}$ ouputs then goes negative. Term S, which is true when $S\theta$ is positive, goes false; term $\bar{S}$ then goes true. True A, $\bar{S}$, and $\bar{C}$ (cosine going negative) makes DA1 true (the switching pulse being obtained at 108 in FIG. 2) and the output of switched amplifier 103 is applied to the integrator 100. A, $\bar{S}$, $\bar{A}$, and S are variously applied via gates 111 and 112, and $\bar{C}$ is applied via gates 110 and 110a. Thet integrator output is now decreasing and will continue until an output of $-100$ volts is reached, at which time DA1 will turn off and remain off until $+100$ volts, (or 360 degrees from where is was turned off), is reached.

The block 106 marked "1-shot" on the block diagram of FIG. 2 is a variable time delay device such as a multivibrator used to inhibit DA1 from switching. Inputs to the 1-shot are $+\theta$, $-\theta$ and the DA1 or $\overline{DA1}$ terms from the DA1 switching flip-flop 107. The output is normally for example $-6$ volts. The delay flop is triggered at 109 upon a change of state of switch DA1, at which time the output goes to 0 volts. Duration of the zero volt output pulse, applied via gates 110 and 110a, is determined by the rate of change of $\theta$. If $\theta$ is changing slowly, the duration of the pulse is long; if the $\theta$ changes fast, the pulse is terminated sooner. The purpose of the variable pulse length is to inhibit triggering of the flip-flop 107 by noise spikes of the comparator (105) as the sine wave crosses through zero. The circuit basically generates a voltage proportional to the absolute value of the input angle, and then uses this voltage to reset the one shot multivibrator. The higher the voltage, the faster the reset.

The resolver also enables conversion from rectangular to polar coordinates to yield outputs defined by the following equations:

$$-R = \sqrt{x_1^2 + Y_1^2} \quad (3)$$

$$\theta = \tan^{-1} \frac{X_1}{Y_1} \quad (4)$$

For this purpose, relays K-1, K-2, K-3 and K-4 are energized, the effect af energizing relays K-1, K-2 and K-3 having been previously discussed. Energization of K-4 disconnects the $\theta$ input, connects the output at 79 (of multiplier 73) to the $\theta$ input via path 120, disconnects the usual input of comparator 61 and connects that input with $R_2$ input, and disconnects the usual input of comparator 57 and connects that input with the $R_1$ input. In this mode, the $R_1$ input is $X_1$ and $R_2$ input is $Y_1$. Output $-R$ according to Equation 3 is taken at terminal 80, and output $\theta$ according to Equation 4 is taken at terminal 79.

Figure 4:
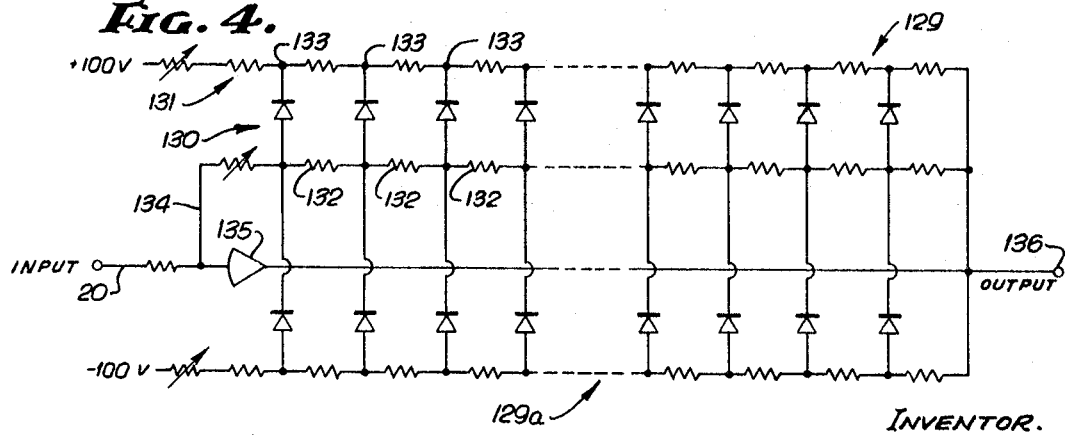
FIG. 4 illustrates one form of sine or cosine generator usable in the resolver.

FIG. 4 illustrates a sinusoidal fixed diode function generator of the type that may be used in the sine and cosine function generators 10 and 11. The 0 to $+90$ degree section 129 of the generator includes breakpoint diodes 130, voltage divider 131, breakpoints 133 in the divider, resistance segments 132, summing junction 134, and operational amplifier 135, all connected as shown. The 0 to $-90$ degree section 129a of the divider has a corresponding voltage divider and breakpoint diodes, as shown. Input is applied at point 20, and output is taken at 136. FIG. 5 illustrates how the lines between breakpoints approximate a portion of the sine curve. The generator operates by changing slope gains at predetermined breakpoints, slope changes being accomplished by the series resistance slope divider placed in the feedback impedance of the DC operational amplifier 135, as seen in FIG. 4. FIG. 5 shows positive output only, for simplicity. The diodes 130 are chosen to conduct at predetermined voltages in accordance with the slope changes of the selected sine curve. Operational amplifier 135 is part of the amplifier 53 of FIG. 1, or of the amplifier 54 in FIG. 1.

The mode patching portion of FIG. 2 shows the points 1R, 2R, ROT and INV subject to selective grounding in order to selectively energize the relays K-1 . . . K-4 in proper combination for selection of the various modes of operation described above.

I claim:

1. In a resolver, sine and cosine generators with summing paths for fixed amplitude input signals associated with a preselected radian range from $+\pi$ to $-\pi$, and for an input signal $\theta$ variable within limits associated with the boundaries of said range, switch means connected in series with certain of said paths to control signal application to the generators via said paths, and control logic means to operate said switches in response to change of $\theta$ between said limits and characterized in that the generators will generate sine and cosine versions of $\theta$, said $\theta$ input paths being directly connected with said generators.

2. In a resolver,
 (A) a sine generator and summing paths for sine generator input signals representing:
  (a) an input angle $\theta$ variable between limits delineating an associated $2\pi$ radian range
  (b) $-2\theta$, (c) π radians, and
(d) —π radians;
(B) a cosine generator and summing paths for cosine generator input signals representing:
(e) θ
(f) —2θ, and
(g) —π/2 radians;
(C) switch means connected in series with certain of said paths associated with the —2θ, π and —π signals to control application of the signals —2θ, π, and —π to the generators via said paths, and
(D) control logic means to operate said switches in response to changes in values of the signal θ between said limits characterized that the generators will generate sine and cosine versions of θ.

3. The resolver of claim 2 in which said control logic includes comparator means to effect switch operation controlling application of —2θ, π and —π signals to the sine generator via said paths in response to a polarity change of the cos θ output of the cosine generator.

4. The resolver of claim 2 in which said control logic includes means to effect switch operation controlling application of —2θ signal to the cosine generator in response to a polarity change of θ.

5. The resolver of claim 2 in which said control logic includes means to effect switch operation controlling application of —π and —2θ signals to the sine generator in response to passage of θ through a value corresponding to —π/2 radians.

6. The resolver of claim 2 in which said summing path for —2θ signal includes an inverter.

7. The resolver of claim 2 including network means connected with the sine generator to provide +sin θ and —sin θ outputs.

8. The resolver of claim 2 including network means connected with the cosine generator to provide +cos θ and —cos θ outputs.

9. The resolver of claim 2 including multiplier means having inputs and outputs, certain of said inputs electrically connected to the output sides of the generators, and paths connected to supply scalar input to other inputs of said multiplier means whereby the multiplier means are operable to produce at their outputs products of said generator outputs and scalar input.

10. The resolver of claim 9 in which said multiplier means include primary multipliers to receive $R_1$ scalar input and to produce as outputs the values —$R_1$ sin θ and —$R_1$ cos θ, and including means to produce said $R_1$ scalar input.

11. The resolver of claim 10 in which said multiplier means include secondary multipliers connected to receive $R_2$ scalar inputs and to produce as outputs the values $R_2$ cos θ and —$R_2$ sin θ, and including means to produce said $R_2$ scalar input.

12. The resolver of claim 9 in which said multiplier means include primary multipliers to receive $X_1$ scalar input and secondary multipliers to receive $Y_1$ scalar input, the multiplier outputs being interconnected to yield output values $Y_1$ cos θ —$X_1$ sin θ and $X_1$ cos θ+$Y_1$ sin θ, and including means to produce said $X_1$ and $Y_1$ scalar input.

13. The resolver of claim 2 including means to supply an input dθ/dt, and including means to supply an integrated version of said input dθ/dt to said θ paths to the generators.

14. The resolver of claim 13 in which said last named means includes an integrator having its output connected in series circuit with the θ paths, the integrator having inputs for positive and negative versions of dθ/dt, and apparatus to very the application of at least one of said integrator inputs at times when θ passas through said limits.

15. The resolver of claim 14 in which said apparatus includes an amplifier connected in series with the integrator at the input side thereof to receive dθ/dt and to produce an output —2dθ/dt, and a switch to switch said amplifier output into and out of connection with the integrator input.

16. The resolver of claim 2 including primary and secondary multipliers connected to receive input via the generators, paths connected to supply scalar inputs $X_1$ and $Y_1$ to the multiplier, and a feedback path connected between the output of at least one multiplier and the θ input path, whereby —R and θ outputs are obtainable from certain multipliers, defined approximately as:

$$-R=\sqrt{x_1^2+Y_1^2}$$

and $$\theta=\tan^{-1}\frac{X_1}{Y_1}$$

17. In a resolver, sine and cosine generators with summing paths for fixed amplitude input signals associated with a preselected radian range from +π to —π, and for an input signal θ variable within limits associated with the boundaries of said range, switch means connected in series with certain of said paths to control signal application to the generators via said paths, control logic means to operate said switches in response to change of θ between said limits and characterized in that the generators will generate sine and cosine versions of θ, a path to supply an input dθ/dt, and means to supply an integrated version of said input dθ/dt to θ input paths to the generators.

18. The resolver of claim 1 including multiplier means having inputs and outputs, certain of said inputs electrically connected to the output sides of the generators, and paths connected to supply scalar input to other inputs of said multiplier means whereby the multiplier means are operable to produce, at their outputs, products of said generators outputs and scalar input.

References Cited
UNITED STATES PATENTS

| | | | |
|---|---|---|---|
| 2,697,201 | 12/1954 | Harder | 235—197 |
| 2,769,137 | 10/1956 | Creuser. | |
| 2,879,002 | 3/1956 | Longerich | 235—186 |
| 2,927,734 | 3/1960 | Vance | 235—189 |
| 3,044,705 | 7/1962 | Willhite | 235—197 |
| 3,185,827 | 5/1965 | Herndon | 235—197 |

MALCOLM A. MORRISON, Primary Examiner

R. W. WEIG, Assistant Examiner

U.S. Cl. X.R.

235—186, 197